United States Patent [19]

Ito et al.

[11] Patent Number: 4,780,358
[45] Date of Patent: Oct. 25, 1988

[54] POLYAMIDE ADHESIVE COMPOSITION FOR LAMINATES CONTAINING AMINOSILANE AND GRAFTED POLYOLEFIN

[75] Inventors: Bunsaku Ito; Kimio Fukuda; Rikio Hara, all of Hirakata, Japan

[73] Assignee: Ube Industries, Ltd., Yamaguchi, Japan

[21] Appl. No.: 904,880

[22] Filed: Sep. 8, 1986

Related U.S. Application Data

[62] Division of Ser. No. 813,596, Dec. 26, 1985, Pat. No. 4,690,856.

[30] Foreign Application Priority Data

Dec. 27, 1984 [JP] Japan .................. 59-273973

[51] Int. Cl.$^4$ .............................................. C08L 77/00
[52] U.S. Cl. ..................... 428/220; 525/66; 525/101; 525/102; 525/281; 525/282; 525/283; 525/183; 525/184; 525/425; 525/432
[58] Field of Search ................. 525/66, 431, 101, 102; 428/220

[56] References Cited

U.S. PATENT DOCUMENTS

| | | | |
|---|---|---|---|
| 3,637,550 | 1/1972 | Sprauer | 525/431 |
| 3,644,245 | 2/1972 | Flanagan et al. | 525/431 |
| 4,319,007 | 3/1982 | Khattab | 525/102 |
| 4,404,312 | 9/1983 | Kokubu et al. | 524/504 |

FOREIGN PATENT DOCUMENTS

| | | | |
|---|---|---|---|
| 48-90334 | 11/1973 | Japan . | |
| 49-33930 | 3/1974 | Japan . | |
| 50-98937 | 8/1975 | Japan . | |
| 50-159525 | 12/1975 | Japan . | |
| 59-11355 | 1/1984 | Japan . | |
| 0136369 | 8/1984 | Japan | 525/66 |

*Primary Examiner*—Wilbert J. Briggs, Sr.
*Attorney, Agent, or Firm*—Austin R. Miller

[57] ABSTRACT

A polyamide adhesive composition comprising 100 parts by weight of a polymer component and 0.1 to 5 parts by weight of an aminosilane compound. The polymer component comprises 50 to 99.5% by weight of a polyamide and 0.5 to 50% by weight of a modified polyolefin formed by grafting a polyolefin with an unsaturated compound having a polar group in the molecule and/or a polymer other than polyamides, having a polar group or an aromatic group and a tensile modulus not higher than 2,000 kg/cm$^2$.

7 Claims, No Drawings

POLYAMIDE ADHESIVE COMPOSITION FOR LAMINATES CONTAINING AMINOSILANE AND GRAFTED POLYOLEFIN

RELATED APPLICATION

This is a division of our U.S. application Ser. No. 813,596, filed 12/26/85, now U.S. Pat. No. 4,690,856.

BACKGROUND OF THE INVENTION (1) Field of the Invention

This invention relates to a hot-melt polyamide adhesive composition suitable for use in forming laminates.

(2) Description of the Related Art

Although polyamide resins are effective for bonding surfaces of metal material such as steel plates and aluminum plates and various other materials such as glass, ceramic, and plastic materials, research is being directed into ways of improving the properties of these polyamides for such uses.

When a homopolyamide is used alone as the polyamide resin, the adhesion strength is poor, and accordingly, various proposals have been made to improve the adhesive characteristics of this resin. For example, the following methods have been proposed: a modification method wherein a reactive monomer is added at the step of preparing a polyamide resin to obtain a modified polyamide resin such as a copolymer or terpolymer; a method wherein a primer such as an epoxy type primer is applied prior to the application of a polyamide resin adhesive; and a method wherein a third component is used together with a polyamide resin.

When a modified polyamide resin such as a copolymer or terpolymer is used, the excellent heat resistance which is one of the characteristics of an unmodified polyamide resin, tends to decrease, and the melting point of the modified polyamide resin is lower than that of the unmodified polyamide resin. Accordingly, when a bonded material such as a bonded steel plate is subjected to a high-temperature treatment such as a bake-coating treatment, peeling sometimes occurs in the bonded portion. In the method in which a primer is coated on the surface of an adherend and bonding is then effected with an adhesive, problems such as a reduction of the operation efficiency, prolongation of the bonding time, reduction of the peel strength at a high temperature, reduction of the flexibility, and increase in the cost often arise. Thus, from a practical viewpoint, this method is not preferred.

As another improved hot-melt polyamide resin adhesive, there can be mentioned an adhesive composition formed by incorporating polyethylene into a polyamide resin (Japanese Unexamined Patent Publication No. 51-59,936), a can-forming adhesive composition formed by incorporating an ionomer into a polyamide resin (Japanese Unexamined Patent Publication No. 51-67833), and an adhesive composition formed by incorporating a specific organic silicon compound into a polyamide resin (Japanese Unexamined Patent Publication No. 48-92,439).

The properties of a polyamide resin as a hot-melt adhesive can be improved to some extent by the addition of an additive as mentioned above. In many cases, however, the surface of an adherend must be pre-treated with a primer, and even when the foregoing adhesive compositions are used, it is almost impossible to obtain a sufficiently strong bonding without that primer treatment.

SUMMARY OF THE INVENTION

In view of the foregoing, it is a primary object of the present invention to provide a hot-melt polyamide adhesive composition in which the characteristics of the known polyamide adhesives are further improved, and which can give a sufficient bonding force even without a primer treatment of the surface of an adherend.

In accordance with the present invention, there is provided a polyamide adhesive composition comprising 100 parts by weight of a polymer component and 0.1 to 5 parts by weight of an aminosilane compound, this polymer component comprising 50 to 99.5% by weight of a polyamide and 0.5 to 50% by weight of a modified polyolefin formed by grafting a polyolefin with an unsaturated compound having a polar group in the molecule and/or a polymer other than polyamides, having a polar group or an aromatic group and a tensile modulus not higher than 2,000 kg/cm$^2$.

DESCRIPTION OF THE PREFERRED EMBODIMENTS

Polyamides used in accordance with the present invention include: polylactams such as nylon 6, nylon 11 and nylon 12; polyamides derived from dicarboxylic acids and diamines, such as nylon 66, nylon 61 and nylon 612; copolyamides such as nylon 6/66, nylon 6/610, nylon 6/12, nylon 6/612, nylon 6/66/610 and nylon 6/66/612, and nylon 6/6T (T: terephthalic acid component) and semi-aromatic polyamides derived from aromatic dicarboxylic acids such as isophthalic acid and metaxylene diamine or an alicyclic diamine. Preferably, polylactams and dicarboxylic acid type polyamides are used. These polyamides may be used singly or as mixtures of two or more thereof.

In the polyamide used in the present invention, the kind and concentration of the terminal group and the molecular weight are not particularly limited if the polyamide is selected from the foregoing polyamides. Furthermore, a polyamide containing a low molecular weight substance such as a monomer remaining after the polymerization or an oligomer formed by the polymerization can be used in the present invention.

In the present invention it is important to use a modified polyolefin formed by grafting a polyolefin with an unsaturated compound having a polar group in the molecule and/or a polymer, other than polyamides having a polar group or aromatic group and a tensile modulus not higher than 2000 kg/cm$^2$.

The polyolefin can include homopolymers and copolymers of ethylenic olefins such as ethylene, propylene, butene-1, hexene-1, decene-1, 4-methylbutene-1, and 4-methylpentene-1, and copolymers of these ethylenic olefins with non-conjugated dienes such as 1,4-hexadiene, pentadiene, dicyclopentadiene, methyltetrahydroindene, methylenenorbornene, and ethylidenenorbornene. Furthermore, rubbers such as ethylene/propylene rubber, butyl rubber, and styrene/butadiene rubber; liquid rubbers; and copolymers such as ethylene/acrylic acid copolymer, ethylene/ethyl acrylate copolymer, and ethylene/vinyl acetate copolymer can be used as the polyolefin. These polyolefins may be used singly or as mixtures of two or more thereof. Preferably, a polyolefin which is more pliable than the polyamide is used.

As the unsaturated compound having a polar group in the molecule that is used as a modifier for modifying the polyolefin in the present invention, there can be mentioned α,β-unsaturated carboxylic acids, alicyclic carboxylic acids and derivatives thereof, such as acrylic acid, methacrylic acid, maleic acid, fumaric acid, itaconic acid, endo-cicyclo(2,2,1)-5-heptene-2,3-carboxylic acid, and cis-4-cyclohexene-1,2-carboxylic acid, and anhydrides, esters, metal salts, amides, imides, nylon monomer neutralization products and oligomer neutralization products thereof.

Furthermore, as the modifier used in the present invention, there can be mentioned alkenylcarboxylic acid anhydrides such as dodecenylsuccinic anhydride, octadecenylsuccinic anhydride, and 4-methacryloxyethyl-trimellitic anhydride, and derivatives of these anhydrides such as corresponding dicarboxylic acids, monoesters thereof, and nylon monomer or oligomer neutralization products.

Moreover, a compound represented by the following formula:

wherein

R$_1$ and R$_2$ are H or an alkyl group, and R$_3$ is a residue formed by notionally removing H from 1,2,3-benzotriazole, phthalimide, orthosulfobenzimide, 1,8-naphthalimide, succinimide, a lactam or a derivative thereof, can be used as the modifier in the present invention. As specific examples, there can be mentioned 1-acryloylbenzotriazole, 1-acryloylphthalimide, 1-acryloylsulfobenzimide, 1-acryloylnapthalimide, and methacryloylbenzotriazole.

The unsaturated compound (modifier) used in the present invention is added in an amount of 0.01 to 5.0 parts by weight, preferably 0.01 to 3.0 parts by weight, per 100 parts by weight of polyolefin. If the amount of the unsaturated compound added is smaller than 0.01 part by weight per 100 parts by weight of the polyolefin, the compatibility of the modified polyolefin in the composition is reduced. In contrast, if the amount of the modifier added is larger than 5 parts by weight per 100 parts by weight of the polyolefin, the viscosity is drastically increased.

The peroxide used for grafting the polyolefin in the present invention can include: t-butyl hydroperoxide, di-tert-butyl peroxide, dicumyl peroxide, and benzoyl peroxide. An appropriate peroxide is selected from these compounds.

The peroxide is added in an amount of 0.01 to 5.0 parts by weight, preferably 0.01 to 1.0 part by weight, per 100 parts by weight of the polyolefin. If the amount of the peroxide is smaller than 0.01 part by weight per 100 parts by weight of the polyolefin, it is almost impossible for the peroxide to act as a reaction initiator. Even if the peroxide is added in an amount larger than 5 parts by weight per 100 parts by weight of the polyolefin, the reaction-initiating action is not enhanced.

It is preferred that the grafting modification of the polyolefin be effected by dry-blending the modifier and peroxide into the polyolefin and melt-kneading the blend.

A metal salt of an unsaturated acid may be used for graft-modifying the polyolefin to convert it to a metal salt, but this graft modification is preferably accomplished by fusing and kneading the polyolefin after modification with the unsaturated acid together with a metal oxide such as MgO or adding such a metal oxide at the time of modification. The neutralization with a nylon monomer can be accomplished in the same manner as the conversion to a metal salt. A part (ordinarily up to 90% weight) of the thus-obtained modified polyolefin may be substituted with an unmodified polyolefin.

In the present invention other polymers having a polar or aromatic group and a tensile modulus not higher than 2000 kg/cm$^2$ may be used. For example, there may be used a terephthalic acid/polyether polyester, a polyester ether amide, an acrylonitrile rubber, an ethylene/vinyl acetate copolymer, a liquid rubber such as Hycar CTBN, a polyester, and a styrene/butadiene rubber, so far as the tensile modulus is within the above-mentioned range.

It is known that the aminosilane compound used in the present invention is effective as a surface modifier for glass, inorganic fillers, and synthetic resins. The aminosilane compound used in the present invention can be selected from these known aminosilane compounds. For example, there can be mentioned α-aminoethyltriethoxysilane, γ-aminopropyltriethoxysilane, α-aminopropyltriethoxysilane, γ-aminopropyltriethoxysilane, α-aminobutyltriethoxysilane, and N-β-(aminoethyl)-γ-aminopropyltrimethoxysilane.

The aminosilane compound is incorporated in an amount of 0.1 to 5 parts by weight, preferably 0.3 to 3 parts by weight, per 100 parts by weight of the total polymer component (the sum of the polyamide resin and the modified polyolefin or the like).

The adhesive composition of the present invention may be prepared by adding the aminosilane compound (silane coupling agent) at the step of melt-kneading the polyamide together with the modified polyolefin and/or the polymer having a tensile modulus not higher than 2000 kg/cm$^2$, pelletizing the kneaded composition and forming the pelletized composition into an adhesive sheet (or film) having a thickness of 0.05 to 1.55 mm. Furthermore, there may be adopted a method comprising dry-blending the silane coupling agent to the melt-kneaded mixture of the polyamide with the modified polyolefin and/or the polymer having a tensile modulus not higher than 2000 kg/cm$^2$, or adding the silane coupling agent during the kneading operation and forming the kneaded composition into an adhesive sheet (or film) having the above-mentioned thickness. Another method comprises a molten mixture (master batch) of the polyamide with the modified polyolefin and/or the polymer having a tensile modulus not higher than 2000 kg/cm$^2$, and adding the remaining portion of the polyamide and the silane coupling agent to the master batch, melt-kneading the mixture and forming the kneaded mixture into an adhesive sheet (or film) having the above-mentioned thickness. Moreover, there is still another method in which the polyamide is dry-blended with the polyolefin, modifier, peroxide, and silane coupling agent, with the blend being melt-extruded to effect modification of the polyolefin and shaping (formation of a sheet or film) simultaneously.

In the present invention, it is preferred that the silane coupling agent be dry-blended into the polymers in an atmosphere containing an inert gas such as nitrogen gas. It is also preferred that the blend be supplied into a hopper of an extruder sealed with such an inert gas, since this improves the adhesiveness of the obtained adhesive composition. It is further preferred that the silane coupling agent be forced into a vent portion or melting portion of an extruder (other components are dry-blended or kneaded in an $N_2$ atmosphere), as this allows control of the formation of an undesirable gel-like product on the lip of the die.

Dyes, pigments, fillers such as calcium carbonate or talc, nucleating agents, fibrous materials such as glass fibers, metal fibers, carbon fibers, Aramide fibers, metal powders, blowing agents, thermal stabilizers such as a phenolic stabilizer for the polyolefin, copper type stabilizers, amine type stabilizers or a metal salt for the polyamide may be appropriately incorporated in the adhesive composition depending upon the intended use. These additives may be used singly or in combination. An optimum amount of the additive may be experimentally determined, but ordinarily the additive is incorporated in an amount of 0.01 to 100 phr based on the total amount of the polymers.

The adhesive composition of the present invention is ordinarily used in the form of a sheet or film. When the adhesive composition is formed into a sheet or film, the thickness may be adjusted according to the thickness of the T-die and take-up speed.

The adhesive composition of the present invention may be applied to various inorganic and organic base materials, and is especially preferably applied to metals. The kind of metal is not particularly limited, but iron, aluminum, copper, and alloys thereof are preferred. These metals may be foils, plates, pipes, rods, and other rigid articles having an optional shape. In the case of plates, the thickness is preferably 0.01 to 3 mm, and more preferably 0.2 to 0.5 mm. When the adhesive composition is applied to a metal, the surface of the metal is preferably cleaned before application. If desired, the metal may be subjected to a surface treatment such as a sand blast treatment or a treatment with a phosphate or chromate.

When a metal plate is used as the metal, there may be adopted structures comprising the following combinations: adhesive composition layer/metal layer, resin or rubber layer/adhesive composition layer/metal layer, metal layer/adhesive composition layer/resin or rubber layer/adhesive composition layer/metal layer, and combinations thereof (in other metal materials, similar structures may be adopted). In the case of a laminated (composite) metal plate having a sandwich structure (metal layer/polymer core layer/metal layer), the polymer core layer may be composed solely of the adhesive composition, but preferably, it has a three layer structure composed of adhesive composition layer/resin or rubber layer, preferably resin layer/adhesive composition layer. In the latter case, the thickness of each adhesive composition layer is preferably 5 to 100 μm, the thickness of each metal layer is preferably 0.1 to 10 mm, more preferably 0.2 to 0.5 mm, and the thickness of the polymer core layer is preferably 0.01 to 10 mm, more preferably 0.2 to 0.7 mm. Preferably, the thickness of the laminated metal plate is 0.3 to 15 mm, and more preferably 0.7 to 1.5 mm. The two metal plates may be the same or different. The polymer core layer (adhesive sheet) is heat-fusion-bonded to the metal layer by press forming or continuous forming using a roll.

When the adhesive composition of the present invention is laminated, the water content in the adhesive composition is preferably adjusted to not more than 5% by weight, and more preferably not more than 2% by weight. Preferably, the adjustment of the water content in the adhesive sheet is accomplished by passing the adhesive sheet through warm water.

It is preferred that the polymer core layer be laminated with the metal plate under conditions such that the pressure applied to the surface of the metal plate is 1 to 6 kg/cm$^2$, the temperature is 160° to 300° C., and the time duration is 2 to 8 minutes. After heating, the laminate is cooled below 160° C., preferably under compression.

Laminated metal plate prepared according to the polyamide adhesive composition of the present invention can be used as interior or exterior materials for cars, for construction materials, industrial materials, and for sporting goods.

The present invention will now be described with reference to the following examples. In the examples, all "parts" are designated by weight.

Formation of Laminated Metal Plate With A Polyamide Adhesive Composition

A resin sheet (for example, an adhesive composition sheet) having a thickness of 0.65 mm was inserted between chromium-deposited steel plates (SPB) having a thickness of 0.27 mm, which had been degreased by Metasol HP 400 (supplied by Marubishi Yuka). The assembly was placed between hot plates maintained at 250° C. by using spacers (1 mm in thickness) and preheated for 2 to 3 minutes under low pressure. After degasification, the assembly was compressed under a pressure of about 5 kg/cm$^2$ at the same temperature for 5 minutes. The laminate was rapidly cooled to 66° C. under compression, and the laminate was then taken out.

T-Peel Strength

The T-peel strength was measured at 23° C. according to the method of JIS K 6854 (200 mm/min).

Chemical Resistance

The sample was immersed in gasoline at 40° C. for 30 minutes, and the T-peel strength was measured according to the above-mentioned method.

Flexural Modulus

A test piece having a thickness of 1 mm, a width of 25 mm, and a length of 150 mm was used, and the flexural modulus was measured at a span distance of 100 mm and a cross head speed of 5 mm/min according to the method of ASTM D-790.

Tensile Modulus

The tensile modulus was measured according to the method of ASTM D-882-73.

Dispersion State of Other Polymer

The adhesive composition was cooled in liquified nitrogen, the fracture face was extracted with an elastomer solvent, and the dispersion state was evaluated based on an electron microscope photograph.

EXAMPLE 1

Polypropylene (PP) was dry-blended with 0.3 phr of maleic anhydride and 0.3 phr of t-butyl hydroperoxide. The blend was melt-kneaded at 250° C. at an extrusion rate of 2 kg/hr by using a twin screw extruder having a screw diameter of 30 mm to obtain modified polypropylene (modified PP: M-PP).

Then, 15 parts of the modified PP were dry-blended with nylon 6 (1013B supplied by Ube Industries, Ltd.), and N-β-(aminoethyl)-γ-aminopropyltrimethoxysilane (supplied by Nippon Unicar) was supplied as the silane coupling agent from a vent of the extruder by a pump in an amount of 2.5 phr based on the total polymers. The mixture was melt-kneaded at 240° C. at an extrusion rate of 8 kg/hr by using a twin screw extruder provided with a T-die having a thickness of 1 mm and a width of 30 cm in a nitrogen gas atmosphere. An adhesive sheet having a thickness of 0.65 mm was continuously formed at a take-up speed of 1 m/min. The operation was continued for 3 hours, with no formation a gel-like product on the lip of the T-die.

The water content of the thus-obtained adhesive sheet was adjusted to 1.0% by weight, and the adhesive sheet was laminated with the above-mentioned steel plate (0.27 mm in thickness) to obtain a laminated plate (composite plate) having a thickness of 1.0 mm.

The obtained results are shown in Table 1.

EXAMPLE 2

The procedures of Example 1 were repeated in the same manner except that an ethylene/ethyl acrylate copolymer (EEA) (DPDJ8026 supplied by Nippon Unicar) was used instead of PP, whereby modified EEA (M-EEA-MA) was obtained.

An adhesive composition was prepared in the same manner as described in Example 1 except that this modified EEA was used instead of modified PP and the amount of the aminosilane was changed.

The obtained results are shown in Table 1.

EXAMPLE 3

The procedures of Example 1 were repeated in the same manner except that an ethylene/propylene copolymer rubber (EPR) (EP-02P supplied by Japanese Synthetic Rubber) was used instead of EEA to form modified EPR (M-EPR-MA) and the amount of the aminosilane was changed.

The obtained results are shown in Table 1.

EXAMPLE 4

The procedures of Example 3 were repeated in the same manner except that N-laurylmaleimide was used as the modifier and the resulting modified EPR (M-EPR-LMI) was used.

The obtained results are shown in Table 1.

EXAMPLE 5

The procedures of Example 2 were repeated in the same manner except that, when EEA was modified, MgO was added in an amount such that 50% of malaeic anhydride was changed to a metal salt to form a modified EEA (M-EEA-Mg) and the amount of the aminosilane was changed.

The obtained results are shown in Table 1.

EXAMPLE 6

The procedures of Example 1 were repeated in the same manner except that unmodified EPR was used in combination with modified PP (M-PP) and the amount of the aminosilane was changed.

The obtained results are shown in Table 1.

EXAMPLE 7

The procedures of Example 2 were repeated in the same manner except that unmodified EPR was used in combination with modified EEA (M-EEA-MA) and the amount of the aminosilane was changed.

The obtained results are shown in Table 1.

EXAMPLE 8

The procedures of Example 3 were repeated in the same manner except that unmodified EPR was used in combination with modified EPR (M-EPR-MA) and the amount of the aminosilane was changed.

The obtained results are shown in Table 1.

EXAMPLE 9

The procedures of Example 2 were repeated in the same manner except that, as shown in Table 1, the ratio between nylon 6 and modified EEA (M-EEA-MA) and the amount of the aminosilane were changed. The obtained results are shown in Table 1.

EXAMPLE 10

The procedures of Example 1 were repeated in the same manner except that the amount of the aminosilane was changed as shown in Table 1.

The obtained results are shown in Table 1.

EXAMPLES 11 THROUGH 16

Nylon 6 (90 parts) was dry-blended with a polymer (10 parts) as shown in Table 1. The blend was kneaded at 240° C. at an extrusion rate of 4 kg/hr by using a twin screw extruder. Then, 100 parts of the formed composition were dry-blended with 1.7 parts of the silane coupling agent, and the composition was melt-kneaded in a nitrogen gas atmosphere by using a twin screw extruder provided with a T-die having a thickness of 1 mm and a width of 30 cm, and formed into a sheet having a thickness of 0.65 mm. The amount of the aminosilane was as shown in Table 1.

TABLE 1

|  | Composition | | | Amount (PHR) of aminosilane | Tensile modulus (kg/cm$^2$) of nylon 6 or other polymer | Dispersed particle size (μm) and dispersion state of polymer other than nylon 6 | Properties of composite plate | | |
| --- | --- | --- | --- | --- | --- | --- | --- | --- | --- |
|  | Amounts (parts) of nylon 6 | Kind and amount (parts) of polymer | | | | | Peel strength (kg/25 mm) | Gasoline resistant peel strength (kg/25 mm) | Flexural modulus (kg/mm$^2$) |
| Example 1 | 85 | M—PP | 15 | 2.5 | 9000 | <10 | 62.3 | 61.0 | 18700 |
| Example 2 | 85 | M—EEA—MA | 15 | 2.0 | 3400 | <5 | 60.5 | 59.9 | 18500 |
| Example 3 | 85 | M—EPR—MA | 15 | 1.2 | 80 | <5 | 58.9 | 57.0 | 18600 |
| Example 4 | 85 | M—EPR—LMI | 15 | 1.2 | 80 | <10 | 61.0 | 59.1 | 18500 |
| Example 5 | 85 | M—EEA—Mg | 15 | 2.0 | 3400 | <5 | 62.8 | 61.5 | 18400 |
| Example 6 | 80 | M—PP | 10 EPR 10 | 1.8 | 9000 | <12 | 61.5 | 61.1 | 18100 |
| Example 7 | 80 | M—EEA—MA | 10 EPR 10 | 1.2 | 3400 | <4 | 62.0 | 61.3 | 18100 |
| Example 8 | 80 | M—EPR—MA | 4 EPR 16 | 1.2 | 80 | <3 | 63.0 | 62.3 | 18200 |

TABLE 1-continued

| | Composition | | Amount (PHR) of amino-silane | Tensile modulus (kg/cm²) of nylon 6 or other polymer | Dispersed particle size (μm) and dispersion state of polymer other than nylon 6 | Properties of composite plate | | |
|---|---|---|---|---|---|---|---|---|
| | Amounts (parts) of nylon 6 | Kind and amount (parts) of polymer | | | | Peel strength (kg/25 mm) | Gasoline resistant peel strength (kg/25 mm) | Flexural modulus (kg/mm²) |
| Example 9 | 95 | M—EEA—MA 5 | 3.0 | 3400 | <3 | 62.1 | 61.8 | 18900 |
| Example 10 | 85 | M—PP 15 | 3.0 | 9000 | <10 | 63.2 | 63.0 | 18400 |
| Example 11 | 90 | PEE 10 | 1.5 | 1600 | <5 | 62.3 | 62.0 | 18200 |
| Example 12 | 90 | PES 10 | 1.7 | 1200 | <5 | 60.2 | 60.0 | 18600 |
| Example 13 | 90 | NBR 10 | 1.7 | <150 | <15 | 61.3 | 61.1 | 18500 |
| Example 14 | 90 | BAN 10 | 1.7 | Liquid | <5 | 62.1 | 61.9 | 18200 |
| Example 15 | 90 | EVA 10 | 1.7 | 1400 | <10 | 60.3 | 60.0 | 18400 |
| Example 16 | 90 | SB 10 | 1.7 | <150 | <15 | 60.8 | 60.4 | 18500 |
| Comparative Example | 100 | — | 2.5 | 9600 | — | <1 | <1 | Peeling |

COMPARATIVE EXAMPLE 1

A composition as shown in Table 1 was treated and tested in the same manner as described in Example 1. The obtained results are shown in Table 1.

The abbreviations as used for the polymers shown in Table 1 indicate the following polymers.

PEE: terephthalic/polyether polyester (Pelprene P-40 supplied by Toyo Spinning Co.)

PES: polyester ($\overline{Mn}$ = about 17,000, Vylon 200 supplied by Toyo Spinning Co.)

NBR: acryl nitrile rubber (acrylonitrile content=35% by weight, PN-30A supplied by Japanese Synthetic Rubber)

BAN: Hycar CTBN (liquid rubber supplied by B. F. Goodrich)

EVA: ethylene/vinyl acetate copolymer (ethylene/vinyl acetate=8/2, Everflex supplied by Sumitomo Chemical Co.)

SB: styrene/butadiene copolymer (Tufprene supplied by Asahi Chemical Industries)

EXAMPLE 17

EPDM (ethylene/propylene/ethylidenenorbornene terpolymer, EP57P supplied by Japanese Synthetic Rubber) was dry-blended with 2.0 phr of alkenylsuccinic anhydride and 0.5 phr of t-butyl hydroperoxide, and the blend was melt-kneaded at 330° C. at an extrusion rate of 2 kg/hr by using a twin screw extruder having a screw diameter of 30 mm to obtain modified EDPM (M-EDPM-AA).

This modified EDPM was dry-blended with nylon 6 and the silane coupling agent. In the same manner as described in Example 1, the blend was extruded in a nitrogen gas atmosphere to form an adhesive nylon sheet, a composite plate was prepared, and the physical properties were measured.

EXAMPLE 18

The procedures of Example 17 were repeated in the same manner except that EPR was used instead of EDPM and dodecenylsuccinic anhydride was used instead of the alkenylsuccinic anhydride. Then, the procedures of Example 17 were repeated by using the obtained modified EPR (M-EPR-AA).

EXAMPLE 19

EPR was dry-blended with 0.5 phr of 1-acryloylbenzotriazole and 0.3 phr of t-butyl hydroperoxide. The blend was melt-kneaded at 250° C. at an extrusion rate of 2 kg/hr by using a twin screw extruder having a screw diameter of 30 in the same manner as described in Example 1 to obtain modified EPR (M-EPR-AT). The subsequent treatments were conducted in the same manner as described in Example 17.

EXAMPLE 20

The procedures of Example 19 were repeated in the same manner except that PP was used instead of EPR. Then the procedures of Example 19 were again repeated in the same manner except that the obtained modified PP (M-PP-AT) was used and the amount of the aminosilane was changed.

EXAMPLE 21

The procedures of Example 19 were repeated in the same manner except that EEA was used instead of EPR. Then, the prodecures of Example 19 were again repeated in the same manner except that the obtained modified EEA (M-EEA-AT) was used and the amount of the aminosilane was changed.

EXAMPLE 22

The procedures of Example 19 were repeated in the same manner except that the amount of modified EPR (M-EPR-AT) was reduced and the amount of the aminosilane was changed.

EXAMPLE 23

The procedures of Example 19 were repeated in the same manner except that the amount of modified EPR was changed to 20 parts and the amount of the silane coupling agent was changed to 1.2 phr.

EXAMPLE 24

A die for three-layer extrusion was connected to two extruders, and a three-layer sheet (composite adhesive sheet) having a total thickness of 0.65 mm was continuously prepared so that the surface layers were composed of the adhesive composition of Example 3, the central layer was composed of nylon 6 (1013B), the thickness of the surface layers was 50 m, and the thickness of the central layer was 0.55 mm.

The water content of the sheet was adjusted to 0.8% by weight, the sheet was pre-heated in N₂, and the sheet was sandwiched between chromate-treated steel plates having a thickness of 0.27 mm, which were pre-heated at 250° C. in N₂. The assembly was passed through a plurality of stages of heating and pressing rolls heated at 250° C. and was then rapidly cooled through a plurality of stages of pressing and cooling rolls. The formed composite plate was wound on a winder.

When the properties of the composite plate were measured, it was found that the T-peel strength was 60.2 kg/25 mm at 23° C. and 40.1 kg/25 mm at 110° C., the gasoline-resistant peel strength was 59.0 kg/25 mm, and the flexural modulus was 18,300 kg/mm$^2$.

EXAMPLE 25

In the same manner as described in Example 4, a sheet having a thickness of 0.6 mm was prepared.

TABLE 2

|  | Composition | | | Tensile modulus (kg/cm$^2$) of nylon 6 or other polymer | Dispersed particle size (μm) and dispersion state of polymer other than nylon 6 | Properties of composite plate | | |
|---|---|---|---|---|---|---|---|---|
|  | Amount (parts) of nylon 6 | Kind and amount (parts) of polymer | Amount (PHR) of aminosilane |  |  | Peel strength (kg/25 mm) | Gasoline resistant peel strength (kg/25 mm) | Flexural modulus (kg/mm$^2$) |
| Example 17 | 85 | M—EPDM—AA | 15 | 1.2 | <80 | <7 | 62.3 | 61.9 | 18400 |
| Example 18 | 85 | M—EPR—AA | 15 | " | 80 | <8 | 60.1 | 59.9 | 18400 |
| Example 19 | 85 | M—EPR—AT | 15 | " | 80 | <5 | 63.5 | 62.9 | 18700 |
| Example 20 | 85 | M—PP—AT | 15 | 3.0 | 9500 | <5 | 60.2 | 59.5 | 18100 |
| Example 21 | 85 | M—EEA—AT | 15 | 2.0 | 3460 | <5 | 61.3 | 60.5 | 18600 |
| Example 20 | 95 | M—EPR—AT | 5 | 2.0 | 80 | <5 | 61.5 | 61.0 | 18900 |
| Example 23 | 80 | M—EPR—AT | 20 | 1.2 | 80 | <5 | 62.6 | 62.1 | 18400 |

The sheet was sandwiched between steel plates having a thickness of 0.4 mm and the assembly was treated in the same manner as described in Example 4 to obtain a composite plate having a total thickness of 1.36 mm.

When the properties of the composite plate were measured, it was found that the T-peel strength was 65.2 kg/25 mm, the gasoline-resistant peel strength was 64.8 kg/25 mm, and the flexural modulus was 18,900 kg/mm$^2$.

EXAMPLE 26

In the same manner as described in Example 8, a sheet having a thickness of 0.3 mm was prepared, the sheet was sandwiched between steel plates having a thickness of 0.4 mm, and the assembly was treated in the same manner as described in Example 8 to obtain a composite plate having a total thickness of 1.05 mm.

When the properties of the composite plate were measured, it was found that the T-peel strength was 60.1 kg/25 mm, the gasoline-resistant peel strength was 59.3 kg/25 mm, and the flexural modulus was 19,100 kg/mm$^2$.

As is apparent from the foregoing description, a laminated plate made from the adhesive composition of the present invention has high gasoline, resistance, high heat resistance, and high T-peel strength.

We claim:

1. A polyamide adhesive composition comprising 100 parts by weight of a polymer component and 0.1 to 5 parts by weight of an aminosilane compound, said polymer component comprising 50 to 99.5% by weight of a polyamide and 0.5 to 50% by weight of a modified polyolefin formed by grafting a polyolefin with an unsaturated compound having a polar group in the molecule.

2. A polyamide adhesive composition according to claim 1, wherein when the composition is melt-blended, the polyamide forms a matrix and the modified polyolefin is dispersed in the form of particles in the matrix.

3. A polyamide adhesive composition according to claim 1, wherein the polyolefin is more pliable than the polyamide and has a tensile modulus lower than that of the polyamide.

4. A polyamide adhesive composition according to claim 1, wherein the unsaturated compound having a polar group in the molecule is selected from the group consisting of α,β-unsaturated carboxylic acids, alicyclic carboxylic acid, alkenylcarboxylic acid anhydrides, and derivatives thereof.

5. A polyamide adhesive composition according to claim 1, wherein the unsaturated compound having a polar group in the molecule is selected from the group consisting of the compound represented by the formula:

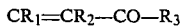

$$CR_1=CR_2-CO-R_3$$

wherein $R_1$ and $R_2$ are H or an alkyl group, and $R_3$ is a residue formed by removing H from 1,2,3-benzotriazole, phthalimide, orthosulfobenzimide, 1,8-naphthalimide, succinimide, a lactam or a derivative thereof.

6. A polyamide adhesive composition according to claim 1, wherein grafting of the polyolefin with the unsaturated compound is effected in the presence of 0.01 to 5.0 parts by weight of a peroxide based on 100 parts by weight of the polyolefin.

7. A polyamide adhesive composition according to claim 1, which is in the form of a sheet or film having a thickness of 0.05 to 1.5 mm.

* * * * *